Dec. 2, 1958  R. C. GWIN, JR  2,862,401
BICYCLE GEAR SHIFT CONTROL
Filed May 2, 1957  2 Sheets—Sheet 1
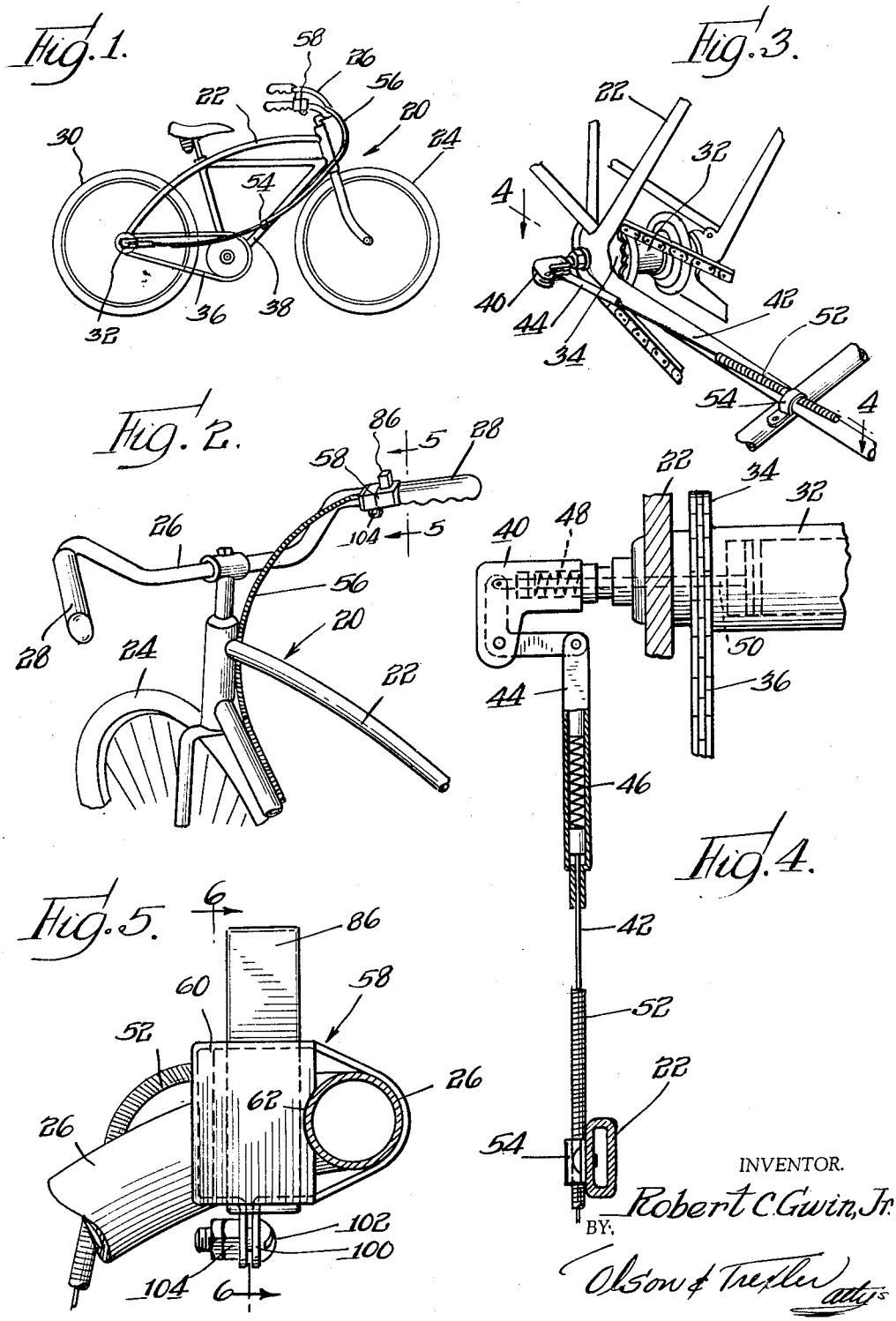
INVENTOR.
Robert C. Gwin, Jr.
BY
Olson & Trexler
attys

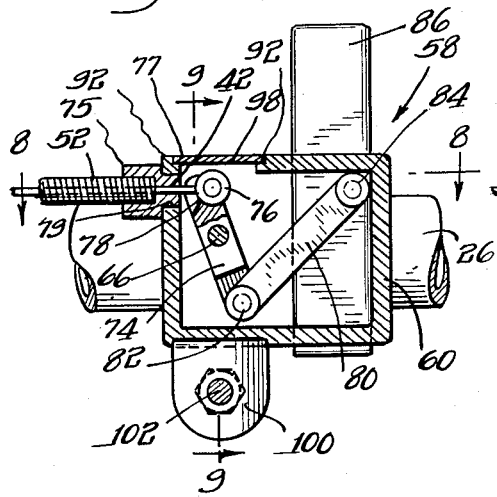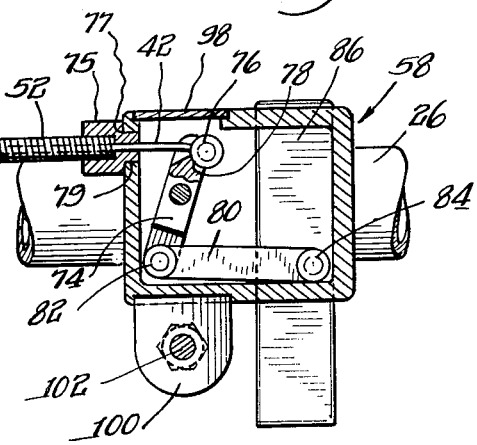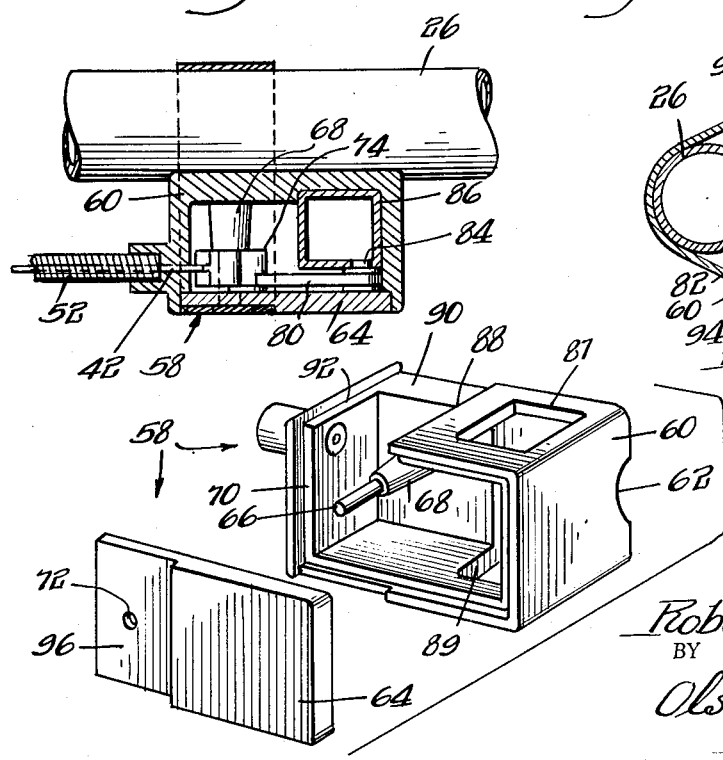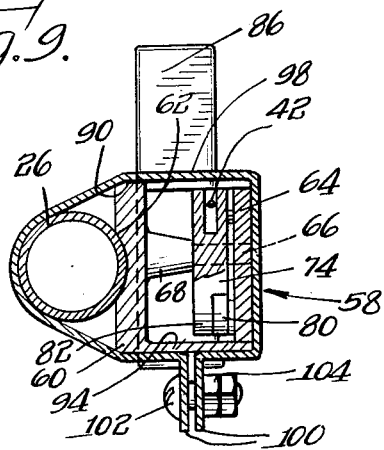

United States Patent Office 2,862,401
Patented Dec. 2, 1958

2,862,401

BICYCLE GEAR SHIFT CONTROL

Robert C. Gwin, Jr., Barrington, R. I., assignor to Arens Controls Inc., Evanston, Ill., a corporation of Illinois Application May 2, 1957, Serial No. 656,640

4 Claims. (Cl. 74—489)

This invention is concerned generally with a control or operating device for use with a flexible cable or the like to control the shifting of a multispeed bicycle transmission.

Multispeed bicycle transmissions are well known in the art. One particular form thereof comprises a coaster brake incorporating a two-speed transmission. Such transmissions, as is well known, incorporate planetary gearing, and are shifted by a toggle lever positioned adjacent the hub and held in proper operating position by the tension of a flexible cable or control. Heretofore, in a two-speed brake of the type noted, it has been common practice to mount a lever adjacent one of the grips on the handle bar of a bicycle. Normally, the transmission or gearing is in low speed position, and the lever must be squeezed adjacent the grip to shift to high speed position.

This invention is concerned with an improved control or operating device for replacing the lever as outlined above, and having many advantages thereover. More particularly, it is an object of this invention to provide such a control or operating device which is easy to operate, and can be operated even by a young child.

In addition, it is an object to provide such a device which is small and compact, and of modern design, and which will not catch on things, thereby leading to damage or injury to the device, or the rider, or surroundings.

Yet another object of this invention is to provide a device of the type noted which is self-locking, and yet which is easily released.

Other and further objects and advantages of the present invention will be apparent from the following description and the accompanying drawings, wherein:

Fig. 1 is an elevational view of a bicycle showing the device forming the subject matter of the invention as installed thereon;

Fig. 2 is an enlarged perspective view showing the operating or control device mounted on a bicycle handle bar;

Fig. 3 is an enlarged perspective view showing the connection of the flexible control to the two-speed brake;

Fig. 4 is a horizontal view partially in section as taken along the line 4—4 in Fig. 3;

Fig. 5 is a vertical view partly in section as taken along the line 5—5 in Fig. 2;

Fig. 6 is a vertical cross sectional view at right angles thereto as taken along the line 6—6 in Fig. 5;

Fig. 7 is a view similarly to Fig. 6 showing the parts in a different position of operation;

Fig. 8 is a horizontal sectional view as taken along the line 8—8 in Fig. 6;

Fig. 9 is a vertical sectional view as taken along the line 9—9 in Fig. 6; and

Fig. 10 is an exploded perspective view showing the housing or case of the device.

Referring now in greater particularity to the drawings, and first to Figs. 1–5 for an understanding of the background of the invention, there is shown a bicycle identified generally by the numeral 20 having a frame 22.

A front wheel 24 is steered by a handle bar 26 in the conventional manner, the handle bar having rubber or similar hand grips 28 thereon. The bicycle also includes a rear wheel 30 having a hub 32 with a sprocket 34 thereon driven by the usual chain 36 from a pedal arrangement 38.

The hub 32 is of a type known in the art, and is capable of driving the rear wheel 30 at either of two speeds relative to the speed of the chain and pedals. The hub contains planetary gearing, and generally operates at a given normal speed. However, a toggle assembly 40 is provided which extends from one end of the hub, and has a flexible cable 42 connected thereto. A control part of the hub 32 is normally held by an internal spring axially inwardly toward the hub to hold the internal gears of the hub in normal or low speed position. When the flexible cable 42 is pulled on, it pivots the toggle assembly 40, and causes the control member to be partially withdrawn, whereby to cause the gears to drive the hub at high speed. A strain relief device 44 incorporating a spring is utilized to connect the cable 42 to the toggle assembly in the event that the gears should tend to jam. The strain relief spring is shown at 46 in Fig. 4, and the spring 48 also shown in this figure is a somewhat diagrammatic representation of the spring urging the control member 50 inwardly of the hub 32. These parts are all well known in the art, and therefore are not shown in great detail.

The flexible cable 42 passes through a sheath 52 which generally comprises a helically coiled wire. The sheath 52 is suitably affixed to the frame 22 of the bicycle by means such as straps 54, and has an unconnected, and hence flexible, section 56 leading from the frame to the handle bar 26 adjacent the right hand grip 28. The sheath 52 and flexible cable or wire 42 are connected at this point to the operating or control device 58 forming the subject matter of this invention, and mounted on the handle bar.

The operating or control device 58 is illustrated in detail in Figs. 6–10, and includes a generally rectangular box-like housing formed with a cylindrical concavity along one sidewall thereof as at 62 for positioning against the handle bar 26. The side opposite the sidewall having the concavity is open, and a cover 64 is recessed therein, and held on the reduced diameter tip 66 of a stud 68 projecting from the first mentioned sidewall. The cover is received against a ledge or shoulder 70 formed within the housing, and may be permanently held in place by virtue of a pressed fit of the reduced tip 66 of the stud in a complementary aperture 72 in the cover. Alternatively, the tip could be threaded, and could be associated with a properly recessed nut member of suitable design.

A lever 74 is pivotally mounted on the reduced tip 66 of the stud 68, and is connected to the upper end of the flexible cable 42 by means of a ball 76 clamped on the end of the cable or wire 42, and received in a suitable shaped recess 78 in the upper end of the lever. The sheath 52 is secured in a fitting 75 having a reduced end 77 retained in an aperture 79 in the front end wall of the housing. The upper end of the lever is bifurcated to provide clearance for the wire or cable 42. A link 80 is pivotally connected to the lower end of the lever 74 as at 82, and the opposite end of the link is pivotally connected at 84 to a plunger 86.

The housing 60 is provided with rectangular apertures 87 and 89 in its upper and lower walls, respectively, and the plunger 86 is arranged to slide up and down in these apertures. Up and down movement is limited by abutment of the pivot 84 and the end of the link 80 against the inner surfaces of the top and bottom walls, and the plunger is of sufficient vertical height to extend a slight distance below the housing when the plunger is in raised position, and to extend slightly above the housing when the plunger is in lowered position. As will be seen in Fig. 7, the pivot 84 in its lowermost position is somewhat below the pivot 82. Thus, there is a toggle action which precludes the flexible wire or cable 42 and the linkage inside of the control or operating device from raising the plunger.

The top wall of the housing is opened at 88, and the sidewall is recessed adjacent this opening at 90. The top wall is provided with shelves or shoulders 92 running transversely across the top wall adjacent the opening 88. The bottom wall is provided with a transverse recess 94, and the cover 64 is relieved at one end as at 96. Thus, there is a relieved or channeled path around three sides of the housing, and a steel strap 98 extends through this channel and around the handle bar 26 to hold the concavity 62 of the body against the side of the handle bar 26. The ends of the strap 98 are provided with apertured, depending ears 100, and a bolt 102 is passed through such ears and has nuts 104 threaded thereon whereby tightly to draw the strap around the housing and the handle bar.

As has been indicated, the normal position of the hub parts results in low speed. The toggle assembly is in the position shown in Fig. 4, and the plunger is in the position shown in Fig. 6. When it is desired to shift the hub or brake into high speed, it is not necessary for the cyclist to release the hand grip 28 with either hand. All that he need do is depress the plunger 86 with his right thumb. Since the link 80 acts as a toggle, or passes beyond a dead center position, the spring tending to force the operating member into the hub is ineffective to return the parts to their normal or slow speed position. However, when it is desired to return to low speed operation, the cyclist need only engage the index finger of his right hand beneath the plunger, whereby to raise it from the depressed position of Fig. 7 to the raised position of Fig. 6.

Accordingly, a push button control of gear shifting is provided. The device provides easier shifting than the lever of the prior art. Hence, it is safer from an operating standpoint. Additionally, it is safer in that it does not have any projecting parts to catch on the cyclist or his clothing, or on any other articles or objects. The operating or control device is of modern design, and hence attractive to the eye. It is sufficiently small and compact as to be positioned out of the way as far as the cyclist is concerned, and also to be positioned so that it will not break if the bicycle should fall over. Furthermore, the device is self-locking, yet easily released.

The specific example of the invention as herein shown and described is for illustrative purposes only. Various changes in structure will no doubt occur to those skilled in the art, and are to be understood as forming a part of this invention insofar as they fall within the spirit and scope of the appended claims.

The invention is claimed as follows:

1. In a bicycle of the type comprising a frame, a drive wheel with a multispeed hub, a handle bar having hand grips thereon, and a flexible cable and sheath for controlling said multispeed hub, a push button control comprising a housing, means mounting said housing on said handle bar adjacent one of said hand grips, means connecting said sheath to said housing, a plunger reciprocably mounted in said housing and projecting therefrom in opposite directions for engagement by the thumb and a finger of a cyclist for manually reciprocating said plunger, a lever in said housing pivotally mounted between its ends and connected at one end to said cable, and a link connected to said lever at the opposite end and to said plunger for shifting said lever and said cable in response to reciprocation of said plunger.

2. The combination as set forth in claim 1 wherein the handle bar is cylindrical and wherein the case is provided on one side with a cylindrical concavity held against said handle bar.

3. The combination as set forth in claim 2 wherein the housing is provided with an external channel, and further including a strap lying in said channel and encircling said handle bar to hold said push button control on said handle bar.

4. The combination as set forth in claim 1 wherein the link is pivotally connected to the lever and is pivotally connected to the plunger, wherein with the plunger operated in one direction the pivotal connection of the link to the plunger lies on one side of a line perpendicular to said plunger and through the pivotal connection of the link to the lever, and with the plunger in the opposite direction of operation the pivotal connection of the link to the plunger lies on the opposite side of a line perpendicular to the plunger and through the pivotal connection of the link to the lever.

References Cited in the file of this patent

UNITED STATES PATENTS

| 426,765 | Brunhoff et al. | Apr. 29, 1890 |
| 1,479,602 | Hayer | Jan. 1, 1924 |

FOREIGN PATENTS

| 641,017 | Germany | Jan. 18, 1937 |